United States Patent
Kishimoto et al.

(10) Patent No.: US 8,581,136 B2
(45) Date of Patent: Nov. 12, 2013

(54) METHOD OF MANUFACTURING BY ELECTRIC DISCHARGE MACHINING AN IMPELLER FOR CENTRIFUGAL ROTATING MACHINE

(75) Inventors: Hisanori Kishimoto, Hiroshima (JP); Toyoaki Yasui, Hiroshima (JP); Akinori Tasaki, Hiroshima (JP); Eizaburo Tanaka, Yokohama (JP); Takashi Maehara, Atsugi (JP)

(73) Assignees: Mitsubishi Heavy Industries, Ltd., Tokyo (JP); Hoden Seimitsu Kako Kenkyusho Co., Ltd., Kanagawa (JP)

( * ) Notice: Subject to any disclaimer, the term of this patent is extended or adjusted under 35 U.S.C. 154(b) by 400 days.

(21) Appl. No.: 13/001,709

(22) PCT Filed: Oct. 6, 2009

(86) PCT No.: PCT/JP2009/005196
§ 371 (c)(1),
(2), (4) Date: Dec. 28, 2010

(87) PCT Pub. No.: WO2010/041431
PCT Pub. Date: Apr. 15, 2010

(65) Prior Publication Data
US 2011/0108526 A1 May 12, 2011

(30) Foreign Application Priority Data
Oct. 6, 2008 (JP) .................................. 2008-259701

(51) Int. Cl.
*B23H 1/00* (2006.01)
(52) U.S. Cl.
USPC ....................................... 219/69.17; 29/889.4

(58) Field of Classification Search
USPC ...................... 219/69.15, 69.17, 69.11, 69.2; 29/889.2, 889.4; 205/654, 665
See application file for complete search history.

(56) References Cited

U.S. PATENT DOCUMENTS 2,396,488 A  3/1946  Bolas et al.
4,411,730 A * 10/1983 Fishter et al. .................. 216/94
(Continued)

FOREIGN PATENT DOCUMENTS

EP   1 211 009    6/2002
JP   08-300228   11/1996
(Continued)

OTHER PUBLICATIONS

Machine translation of Japan Patent document No. 2004-92,650-A.*

(Continued)

*Primary Examiner* — Geoffrey S Evans
(74) *Attorney, Agent, or Firm* — Wenderoth, Lind & Ponack, L.L.P.

(57) ABSTRACT

A method for manufacturing an impeller of a centrifugal rotating machine that is approximately disk-shaped and in which flow passages are formed between a plurality of blades and disposed in a radial manner from the inner circumferential side to the outer circumferential side, provided with a first flow passage formation step that forms a first region on the outer circumferential side within the flow passage by inserting an electrode of a shape fitting to the flow passage with the electric discharge machining method from the outer circumferential side of the disk-shaped body having an outer shape of an impeller, and a second flow passage formation step that forms a second region on the inner circumferential side within the flow passage from the inner circumferential side of the disk-shaped body.

16 Claims, 10 Drawing Sheets

(56) References Cited

U.S. PATENT DOCUMENTS

| | | | |
|---|---|---|---|
| 6,676,826 B2 * | 1/2004 | Battistini et al. | 205/654 |
| 7,305,762 B2 | 12/2007 | Mola | |
| 2009/0308761 A1 * | 12/2009 | Gehron et al. | 205/717 |
| 2010/0316502 A1 * | 12/2010 | Khanhson et al. | 416/90 R |

FOREIGN PATENT DOCUMENTS

| | | |
|---|---|---|
| JP | 2002-235694 | 8/2002 |
| JP | 2004-92650 | 3/2004 |
| JP | 2004-92650 A * | 3/2004 |

OTHER PUBLICATIONS

International Search Report issued Dec. 22, 2009 in International (PCT) Application No. PCT/JP2009/005196.

Written Opinion of the International Searching Authority issued Dec. 22, 2009 in International (PCT) Application No. PCT/JP2009/005196.

* cited by examiner

SURFACE ROUGHNESS PRIOR TO REMOVAL OF AFFECTED LAYER

FIG. 14

SURFACE ROUGHNESS AFTER REMOVAL OF AFFECTED LAYER
(HYDROCHLORIC ACID 27~30°C)

FIG. 15

SURFACE ROUGHNESS AFTER REMOVAL OF AFFECTED LAYER
(HYDROCHLORIC ACID 50°C)

METHOD OF MANUFACTURING BY ELECTRIC DISCHARGE MACHINING AN IMPELLER FOR CENTRIFUGAL ROTATING MACHINE

BACKGROUND OF THE INVENTION

I. Technical Field

The present invention relates to a method of manufacturing an impeller that is used in a centrifugal rotating machine such as a centrifugal compressor.

Priority is claimed on Japanese Patent Application No. 2008-259701, filed Oct. 6, 2008, the content of which is incorporated herein by reference.

II. Description of the Related Art

Generally, an impeller that is used in a centrifugal rotating machine has a hub that is attached to a rotating axis, a shroud that is arranged at an interval outward of the hub, and a plurality of blades that couple the hub and the shroud, with a portion that is enclosed by the side surfaces of these blades, the flow surface of the hub, and the flow surface of the shroud serving as a flow passage for compressing air.

The impeller that is used in this kind of centrifugal rotating machine is generally manufactured by fixing, by fillet welding or groove welding, the blades and the shroud to a disk-shaped main body, since the flow passage has a complex shape that curves in the axial direction and radial direction. However, welding defects easily occur in the fixing by the aforementioned welding, and deformation easily occurs due to locally high temperatures.

For this reason, there has been proposed a method for manufacturing that uses electric discharge machining as a substitute means in a method for manufacturing an impeller by welding (For example, see Japanese Unexamined Patent Application, First Publication No. H08-300228 or Japanese Unexamined Patent Application, First Publication No. 2002-235694).

The electric discharge machining method that is disclosed in Japanese Unexamined Patent Application, First Publication No. H08-300228 relates to the manufacture of a steam turbine static blade, and includes the steps of forming a static blade by electric discharge machining from the lower surface side of a partitioning plate disk positioned with the fluid outlet side of the static blade as an upper surface, finishing an edge and a step on the static blade outlet side that are formed by electric discharge machining from the upper surface side of the partitioning plate disk, and then removing the affected layer of the machined surface that is subjected to electric discharge machining by an acid bath. Thereby, a steam passage is formed between the static blades.

The electric discharge machining method that is disclosed in Japanese Unexamined Patent Application, First Publication No. 2002-235694 relates to a rotor for a centrifugal compressor, and has an electrode that has nearly the same shape as a cavity, and forms circular cavities that become flow passages in a disc by electrical erosion with the electrode.

SUMMARY OF THE INVENTION

However, when manufacturing an impeller that is to be used in a centrifugal compressor using the electric discharge machining disclosed in Japanese Unexamined Patent Application, First Publication No. H08-300228 and Japanese Unexamined Patent Application, First Publication No. 2002-235694, the electrode that is used in the electric discharge machining becomes longer as the length of the blade becomes longer. For that reason, there is the problem of the machining accuracy dropping due to the shape of the electrode. In particular, in the impeller of a centrifugal rotating machine, since the blades have a shape that curves in the axial direction and the radial direction, the shape of the flow passage between the blades is complex, and so it has not been possible to perform the machining with good accuracy by simply inserting the electrode in a two-dimensional manner, as disclosed in Japanese Unexamined Patent Application, First Publication No. H08-300228 and Japanese Unexamined Patent Application, First Publication No. 2002-235694. Also, as the length of the blade becomes longer in the aforementioned manner, and the machining depth becomes deeper, the discharge of the sludge that is produced as a result of the machining becomes difficult, and secondary electric discharge occurs due to the sludge, leading to a drop in the machining efficiency.

The present invention was achieved in view of the above circumstances, and has as its object to provide a method for manufacturing an impeller of a centrifugal rotating machine in which flow passages can be easily, efficiently, and accurately machined between blades.

In order to solve the aforementioned issues, the present invention provides the following means. That is, the present invention is a method for manufacturing an impeller of a centrifugal rotating machine that is approximately disk-shaped and in which flow passages are formed between a plurality of blades and disposed in a radial manner from the inner circumferential side to the outer circumferential side, provided with: a first flow passage formation step that forms a first region on the outer circumferential side within the flow passage by inserting an electrode of a shape fitting to the flow passage with the electric discharge machining method from the outer circumferential side of the disk-shaped body having an outer shape of an impeller; and a second flow passage formation step that forms a second region on the inner circumferential side within the flow passage from the inner circumferential side of the disk-shaped body.

According to this invention, in the first flow passage formation step, the first region on the outer circumferential side within the flow passage is formed by inserting an electrode of a shape fitting to the flow passage with the electric discharge machining method from the outer circumferential side of the disk-shaped body having an outer shape of an impeller, and then in the second flow passage formation step a second region on the inner circumferential side within the flow passage is formed from the inner circumferential side of the disk-shaped body. Thereby, since the second flow passage formation step is performed from the inner circumferential side after the first flow passage formation step, it is possible to shorten the length to be machined in the first region in the first flow passage formation step. As a result, it is possible to shorten the electrode for forming the first region, and it is possible to prevent conventional deformation of the electrode. Also, since it is not necessary to perform machining of the region on the inner circumferential side having a large curvature from the outer circumferential side of the disk-shaped body in the axial direction, it is possible to perform the machining easily and accurately. Also, since it is necessary to just form a portion of the flow passage in the above manner, it is possible to make the machining depth shallow. Thereby, the discharge of sludge that is generated along with the machining is simplified, and it is possible to suppress the generation of a secondary electric discharge by the sludge, and thus possible to improve the machining efficiency. Then, by forming the region of the remainder of the flow passage in the second flow passage formation step, it is possible to readily, efficiently and accurately form the flow passage and the blades as a whole.

In the method for manufacturing an impeller of a centrifugal rotating machine of the present invention, the second flow passage formation step may be performed by inserting an electrode fitting to the shape of the second region from the inner circumferential side of the disk-shaped body with the electric discharge machining method.

According to this invention, by performing the second flow passage formation step by inserting the electrode that fits to the shape of the second region from the inner circumferential side of the disk-shaped body with an electric discharge machining method, it is possible to accurately form the second region within the flow passage of a shape that is set in advance.

In the method for manufacturing an impeller of a centrifugal rotating machine of the present invention, a third passage formation step may be provided that additionally performs machining by electric discharge machining in the first region by inserting an electrode for performing partial machining from the outer circumferential side of the disk-shaped body, after the first flow passage formation step or the second flow passage formation step.

According to this invention, as a third passage formation step, by additionally performing machining by electric discharge machining in the first region by inserting an electrode for performing partial machining from the outer circumferential side of the disk-shaped body, after the first flow passage formation step or the second flow passage formation step, it is possible to more accurately perform the first region flow passage formation.

In the method for manufacturing an impeller of a centrifugal rotating machine of the present invention, an acid cleaning treatment step may be provided that performs an acid cleaning treatment on at least a portion that becomes the surface of the flow passage after formation of the first region and the second region of the flow passage.

According to this invention, since there is provided the acid cleaning treatment step that performs acid cleaning treatment on at least the portion that becomes the surface of the flow passage after respectively forming the first region and the second region of the flow passage, it is possible to remove the affected layer by this acid cleaning treatment step, and thereby it is possible to suppress a reduction in the fatigue property that is attributable to the affected layer.

In the method for manufacturing an impeller of a centrifugal rotating machine of the present invention, a polishing step may be provided that performs polishing of at least the surface of the flow passage after formation of the first region and the second region of the flow passage.

According to this invention, since there is provided the polishing step that performs polishing of the surface of the flow passage, it is possible to make the flow surface within the flow passage smooth, and by thereby reducing the resistance when a fluid flows on the flow passage, it is possible to prevent a drop in the compression efficiency of the centrifugal rotating machine. Also, if this step is performed after performing the acid cleaning treatment, it is possible to make the surface smoother than the state in which only the acid cleaning treatment was performed while removing the affected layer.

According to the method for manufacturing an impeller of a centrifugal rotating machine of the present invention, machining can be easily, efficiently, and accurately performed by performing a first flow passage formation step and a second flow passage formation step.

DETAILED DESCRIPTION OF THE INVENTION

Figure 1:
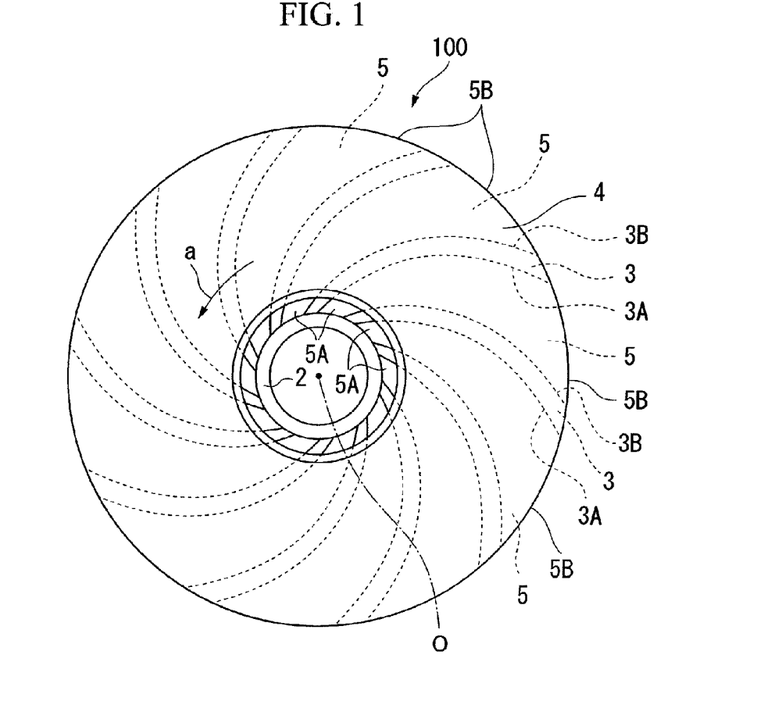
FIG. 1 is a front elevational view of the impeller of the embodiment of the present invention.
Figure 2:
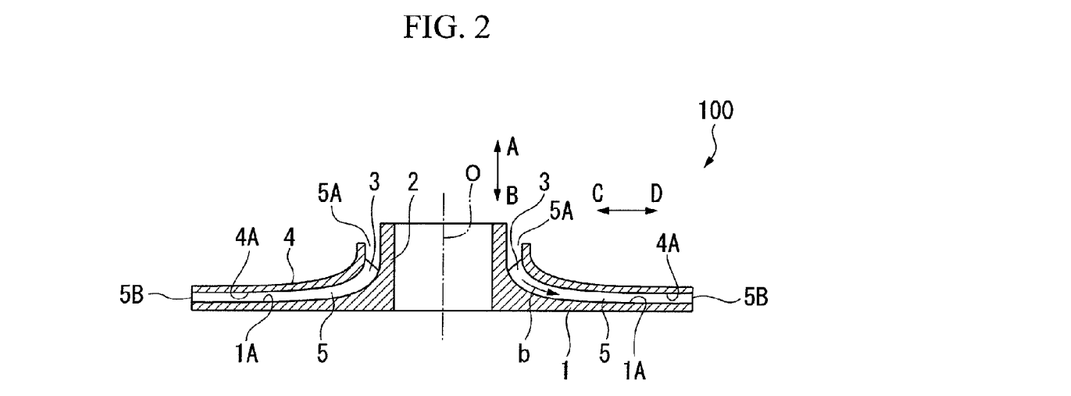
FIG. 2 is a sectional side view of the impeller of the embodiment of the present invention.

The embodiments concerning the method for manufacturing an impeller of the present invention shall be described with reference to FIG. 1 to FIG. 19. That which is denoted by the reference numeral 100 in FIG. 1 and FIG. 2 is an impeller that is manufactured by the method for manufacturing an impeller according to the present invention, and by being attached to a rotating shaft, is mounted on a centrifugal rotating machine such as a centrifugal compressor as a rotating body. As shown in FIG. 1 and FIG. 2, the impeller 100 has an approximately disk-shaped main body 1, an approximately cylindrical hub 2 that is provided in the center portion in the main body 1 and attached to the rotating shaft (not illustrated), a plurality of blades 3 that are disposed on the main body 1 in a radial manner from the hub 2, and a shroud 4 that is disposed separated from the main body 1 in the axial direction and that couples the blades 3.

The rear face of the main body 1 is formed to be an approximately flat surface, while the front face, which serves as flow surface 1A on which a fluid flows, is formed such that the outer circumference side is an approximately flat surface and curves so as to gradually project in the axial direction (the direction of arrow A-B) from the outer circumferential side to the inner circumferential side in the radial direction due to the projection of the hub 2.

Also, each blade 3 is approximately plate-like and along the front surface of the main body 1 formed to curve in the axial direction (the direction of the arrow A-B) toward the inner circumferential side in the radial direction (the direction of the arrow C-D), and is formed in a shape that curves to one side in the circumferential direction along the radial direction (the direction of the arrow C-D). In the following description a first curved face on one side of the blade 3 shall be denoted by reference numeral 3A, and a second curved face on the other side shall be denoted by reference numeral 3B.

The shroud 4 is formed so as to be approximately parallel with the main body 1, that is, curving so as to gradually project in the axial direction (the direction of the arrow A-B) from the outer circumferential side to the inner circumferential side in the radial direction (the direction of the arrow C-D), with the inner circumferential side forming a gap with the hub 2. A flow passage 5 for generating compressed air accompanying rotation is formed between mutually adjacent blades 3. The flow passage 5 is formed surrounded by the first curved surface 3A and the second curved surface 3B of mutually adjacent blades 3, the flow surface 1A that is constituted by the front face of the main body 1 and a flow surface 4A that is constituted by the rear face of the shroud 4. Each flow passage 5 is formed curving in the axial direction (the direction of the arrow A-B) and the circumferential direction (the direction of arrow a), following the shape of the main body 1, the blade 3, and the shroud 4.

When the impeller 100 of a centrifugal rotating machine of the above constitution is rotatively driven in the direction of arrow a in FIG. 1 by a drive portion that is not shown, a flow of air shown by the arrow b is generated in the flow passage 5 from the inner circumferential side to the outer circumferential side in the radial direction, and the air is accelerated by the centrifugal force that is generated by the rotation. Thereby, the air that is drawn in from the inlet 5A of the flow passage 5 is compressed in the flow passage 5 and discharged from the outlet 5B, and thereafter fed to an external device that is not shown on the downstream side.

Next, the steps of manufacturing the impeller 100 that is constituted in the aforementioned manner shall be described with reference to FIG. 3 to FIG. 19.

Figure 3:
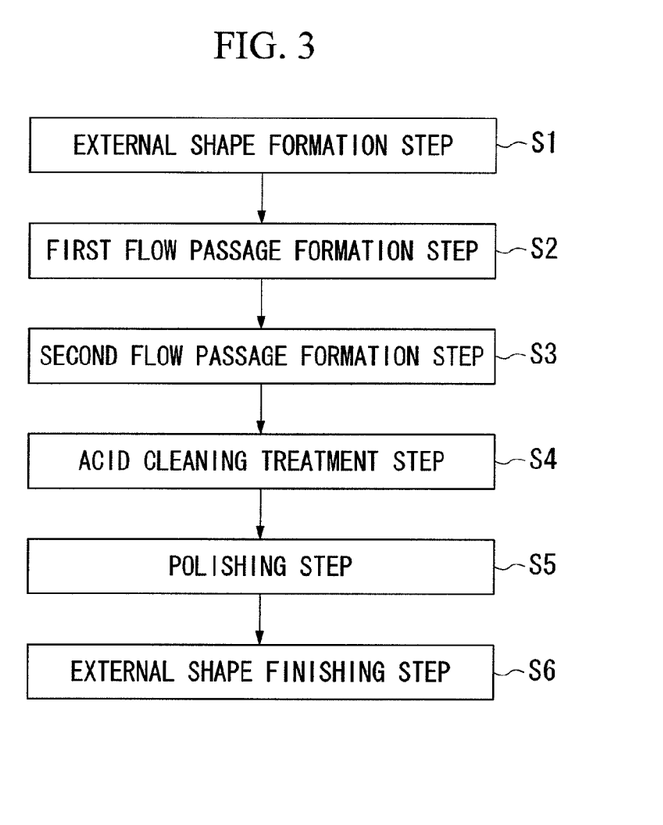
FIG. 3 is a flowchart that shows the manufacturing steps of the impeller of the embodiment of the present invention.

FIG. 3 is a flowchart that shows the manufacturing steps of the impeller 100, and has an external shape formation step S1, a first flow passage formation step S2, a second flow passage formation step S3, an acid cleaning treatment step S4, a polishing step S5, and an external shape finishing step S6.

These steps shall each be described in order.

[External Shape Formation Step]

Figure 4:
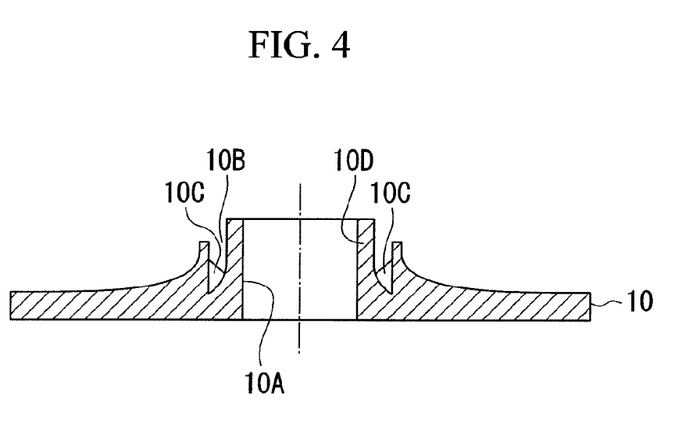
FIG. 4 is a sectional side view that describes the external shape formation step in the manufacturing steps of the impeller of the embodiment of the present invention.

First, the external shape formation step S1 shall be described with reference to FIG. 4. In FIG. 4, that which is denoted by reference numeral 10 is a disk-shaped body that has the contour of the impeller 100, and is formed by a metal such as carbon steel or stainless steel. Lathe machining is performed on a base material not shown having an approximate disk shape to form an insertion hole 10A in which a rotating shaft (not shown) is inserted in the center portion of this disk-shaped body 10, form a slope that smoothly rises from the outer circumferential side to the inner circumferential side in the radial direction to become the front surface of the shroud 4, and furthermore form a circular cavity 10B on the outer circumferential side of the insertion hole 10A of the disk-shaped body 10. By performing additional machining along the axial direction on the circular cavity 10B that is positioned on the outer circumferential side of the insertion hole 10A of this disk-shaped body 10, a plurality of recessed portions 10C are formed in the circumferential direction. This recessed portion 10C ultimately becomes the inlet 5A of the flow passage 5, and so is formed corresponding to the position of the flow passage 5 as shown in FIG. 1. The approximately cylindrical portion (denoted by the reference numeral 10D) that is positioned on the inner side of the recessed portion 10C becomes the hub 2.

[First Flow Passage Formation Step]

Figure 5:
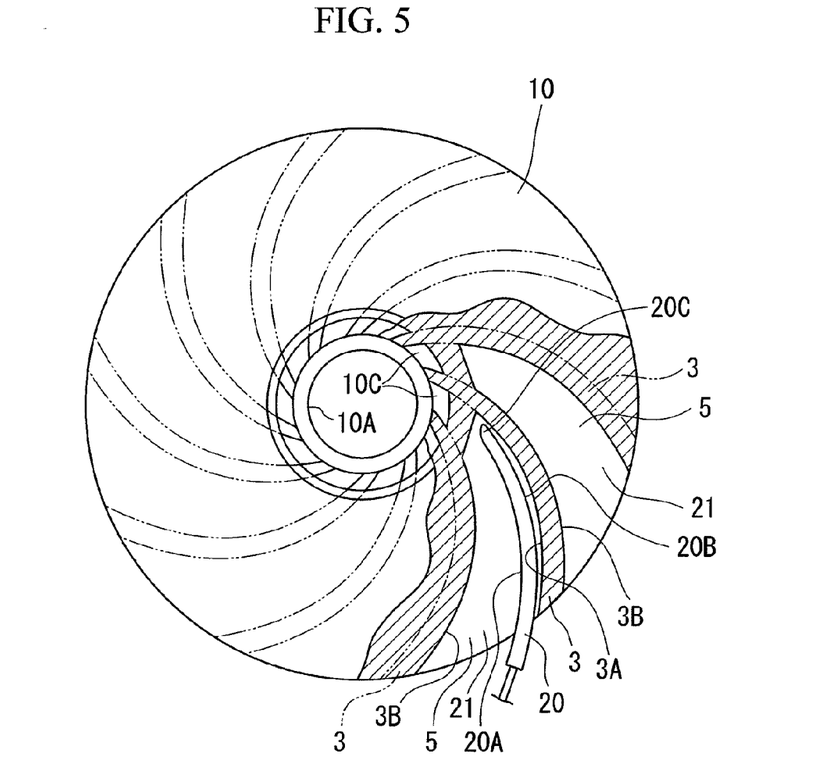
FIG. 5 is a partially broken-out front elevational view that describes the first flow passage formation step in the manufacturing steps of the impeller of the embodiment of the present invention.
Figure 6:
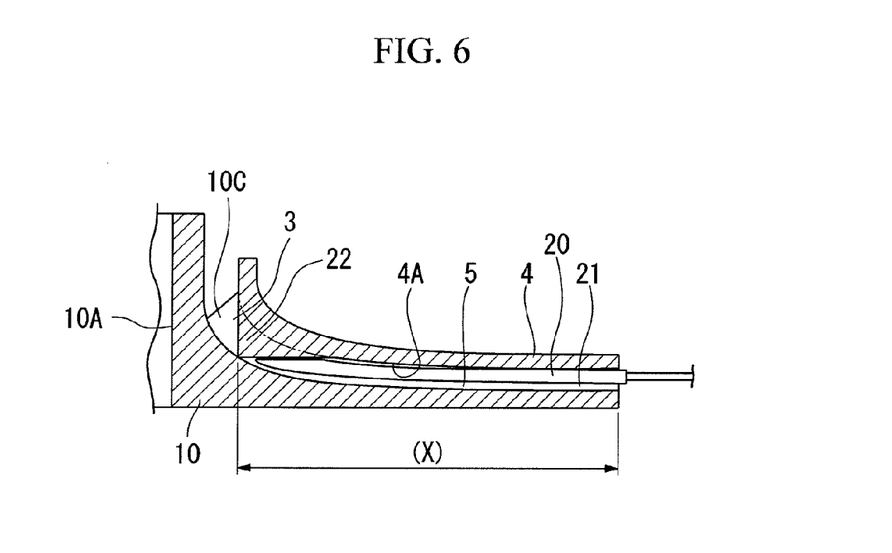
FIG. 6 is a sectional side view that describes the first flow passage formation step in the manufacturing steps of the impeller of the embodiment of the present invention.
Figure 7:
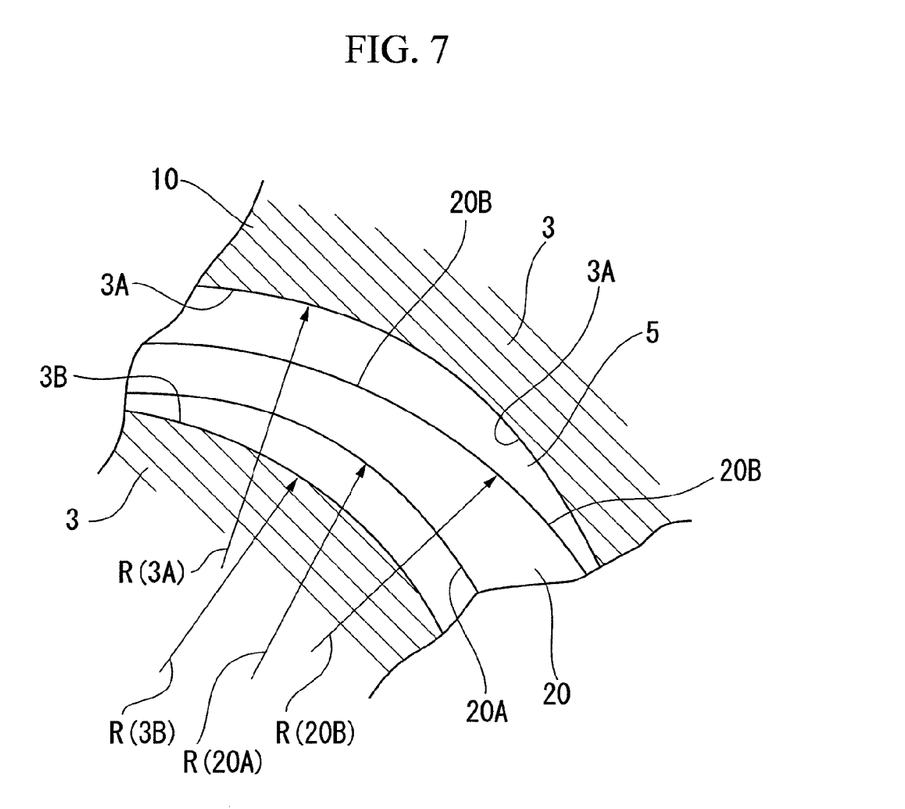
FIG. 7 is an explanatory drawing that shows the relation between the electrode that is used in the first flow passage formation step in the manufacturing steps of the impeller of the embodiment of the present invention and the second flow passage.

The first flow passage formation step S2 shall be described with reference to FIG. 5 to FIG. 7. That which is denoted by reference numeral 20 in these drawings is a working electrode that consists of copper or the like for performing electric discharge machining, and forms in the flow passage 5 from the outer circumferential side of the disk-shaped body 10 a first region 21 (the region indicated by the letter X in FIG. 6) on the outer circumferential side excluding the region of the portion on the inner circumferential side.

The working electrode 20 has a curved surface that fits to the first curved surface 3A, the second curved surface 3B, and the flow surfaces 1A and 4A in the first region 21 of the flow passage 5, and it is desired that this curved shape satisfies the following conditions. That is, as shown in FIG. 7, curvature radii of the second curved surface 3B and the first curved surface 3A of the blades 3 that form the flow passage 5 are respectively $R(3B)$ and $R(3A)$. The working electrode 20 has a first curved face 20A with a curve that fits to the second curved surface 3B of the blade 3, and a second curved face 20B with a curve that fits to the first curved surface 3A of the blade 3, and the curvature radii of the first curved face 20A and the second curved face 20B are $R(20A)$ and $R(20B)$, respectively. The second curved surface 3B of the blade 3 and the first curved face 20A of the working electrode 20 that face each other should be set to satisfy "curvature radius $R(3B) \geq$ curvature radius $R(20A)$", and the first curved surface 3A of the blade 3 and the second curved face 20B of the working electrode 20 that face each other should be set to satisfy "curvature radius $R(20B) \geq$ curvature radius $R(3A)$". By forming the working electrode 20 in this kind of shape, it is possible to make the front tip reach further to the central region within the disk-shaped body 10, without causing the working electrode 20 to make contact with the first curved surface 3A and the second curved surface 3B of the blade 3. Note that by separately using the working electrode 20 having the curvature radius $R(3B)=R(20A)$ and $R(20B)=R(3A)$ for finishing purposes, it is possible to more favorably form the first region 21 in the flow passage 5.

[Second Flow Passage Formation Step]

Figure 8:
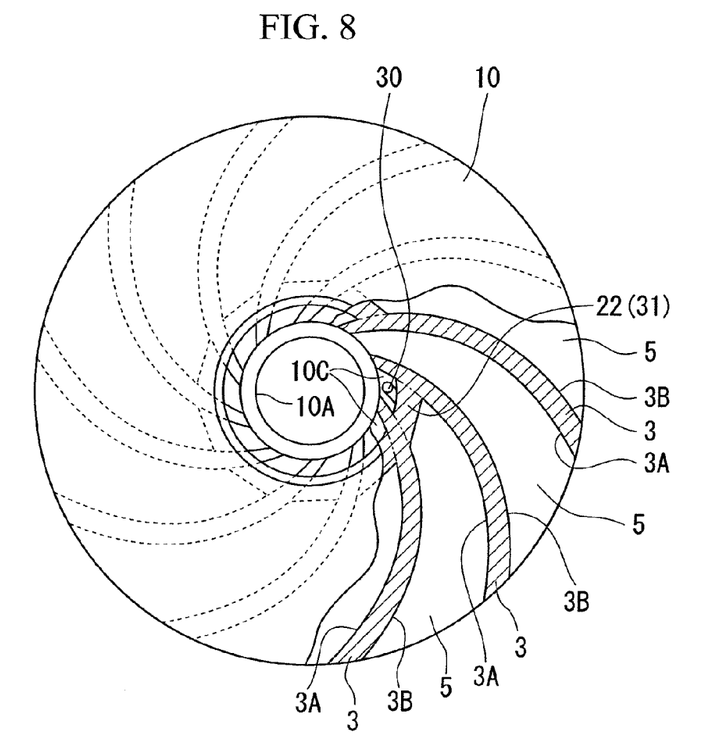
FIG. 8 is a partially broken-out front elevational view that describes the second flow passage formation step in the manufacturing steps of the impeller of the embodiment of the present invention.
Figure 9:
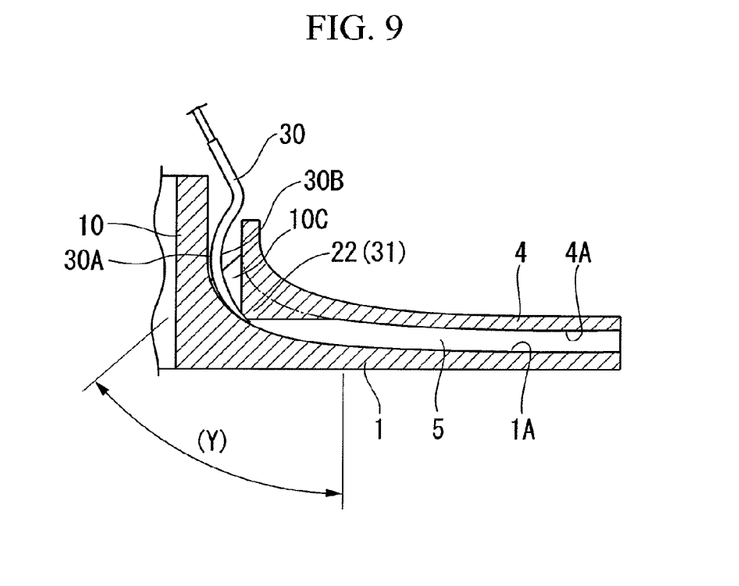
FIG. 9 is a sectional side view that describes the second flow passage formation step in the manufacturing steps of the impeller of the embodiment of the present invention.

The second flow passage formation step S3 shall be described with reference to FIG. 8 to FIG. 9. After forming the recessed portions 10C in the external shape formation step S1 and forming the first region 21 in the first flow passage formation step S2 as described above, an unprocessed region 22 shown by the reference numeral 22 in FIG. 9 remains in the disk-shaped body 10. By removing this unprocessed region 22, the second region 31 (the region shown by the reference numeral Y in FIG. 9) is formed on the inner circumferential side of the disk-shaped body 10.

This second region 31 is a region that that is positioned on the inner circumferential side of the disk-shaped body 10 and that connects the recessed portion 10C that is formed in the external shape formation step S1 and the first region 21 that is formed in the first flow passage formation step S2. In order to form this second region 31, a working electrode 30 is used that forms the flow passage 5 from the recessed portion 10C that is positioned on the inner circumferential side of the disk-shaped body 10 with the electric discharge machining method.

The distal end portion of this working electrode 30 is formed in a hook shape that curves in accordance with the shape of the second region 31 of the flow passage 5. By using this working electrode 30, the unprocessed region 22 is removed and the second region 31 having a pre-supposed shape (the region shown by the reference numeral 9 in FIG. 9) is formed on the inner circumferential side of the disk-shaped body 10.

[Acid Cleaning Treatment Step]

Figure 10:
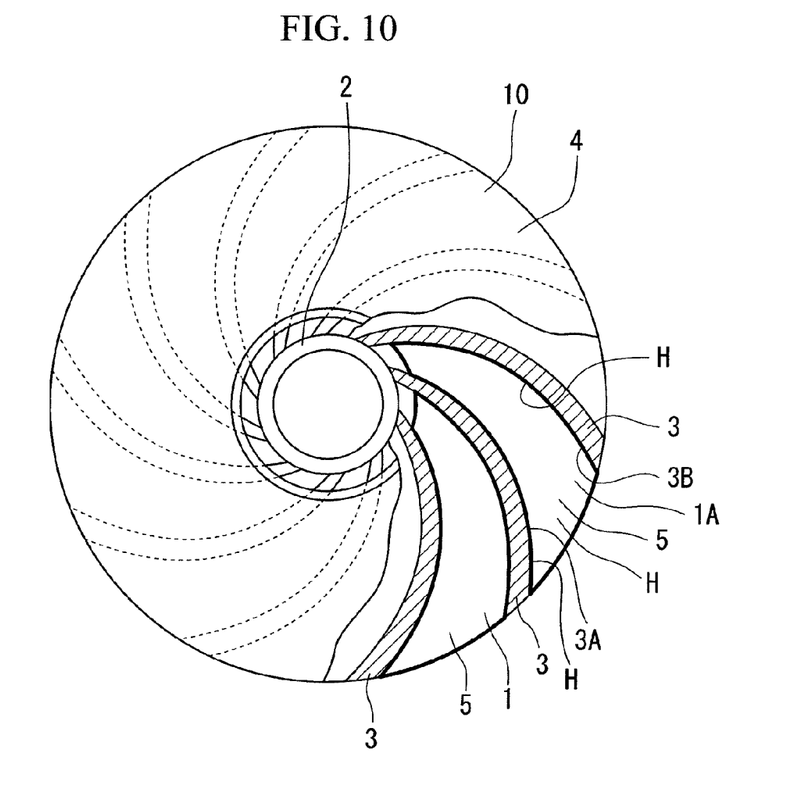
FIG. 10 is a partially broken-out front elevational view that describes the acid cleaning treatment step and the polishing step in the manufacturing steps of the impeller of the embodiment of the present invention.
Figure 11:
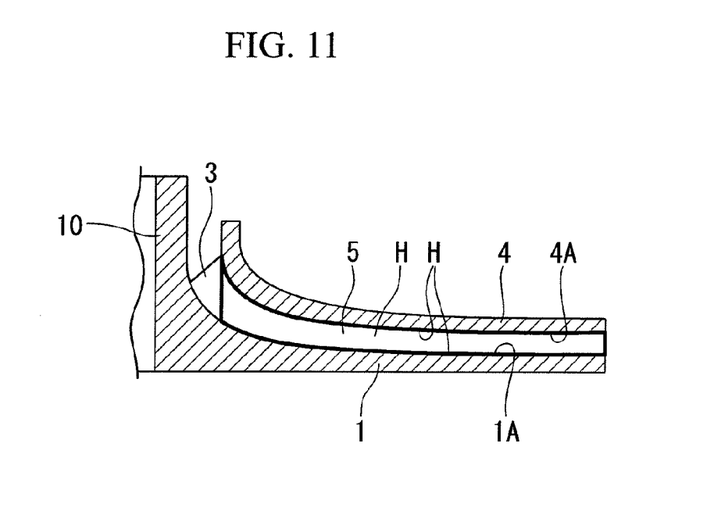
FIG. 11 is a sectional side view that describes the acid cleaning treatment step and the polishing step in the manufacturing steps of the impeller of the embodiment of the present invention.

The acid cleaning treatment step S4 shall be described with reference to FIG. 10 to FIG. 15. This acid cleaning treatment step uses hydrochloric acid or sulfuric acid as an acid cleaning solution, and performs cleaning by immersing the disk-shaped body 10 that has been subjected to the first flow passage formation step S2 and the second flow passage formation step S3 into a liquid layer that is maintained at specified temperature. This acid cleaning treatment step removes the affected layer H that is formed on the first curved surface 3A, the second curved surface 3B, and the flow surfaces 1A and 4A by the electric discharge machining as shown in FIG. 10 and FIG. 11. This affected layer H breaks up easily due to having a high content ratio of carbon and being harder than the metal that is used as the base material of the disk-shaped body 10, and so becomes a cause of reducing the metal-fatigue property. Since the surface roughness of this affected layer H is as rough as 10 to 50 µm, it acts as resistance when air is flowing in the flow passage 5, and thus becomes a cause of reducing the compression efficiency of the centrifugal compressor (centrifugal rotating machine). By removing the affected layer H with the acid cleaning treatment of this step, it is possible to achieve an improvement in the metal fatigue property.

Figure 12:
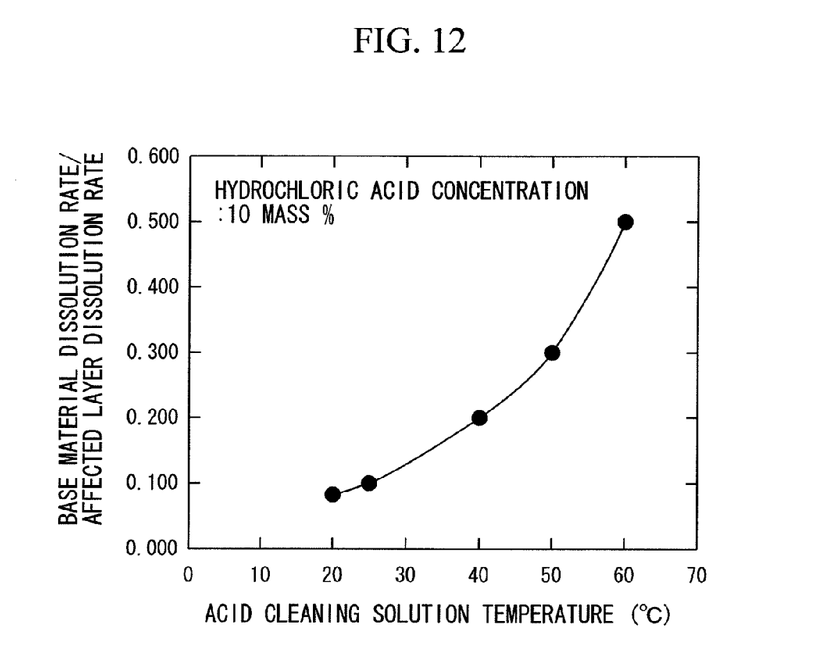
FIG. 12 is a graph that shows the relation between the temperature of the acid cleaning solution in the case of using hydrochloric acid and the ratio of dissolution rates in the acid cleaning treatment step.

The effect of this acid cleaning treatment is described with reference to FIG. 12 to FIG. 15. FIG. 12 is a graph that shows the experiment result of performing acid cleaning treatments using hydrochloric acid of 10 mass % as the acid cleaning solution in which the temperature of the acid cleaning solution was changed, and shows the relationship between the temperature of the acid cleaning solution and the ratio of the dissolution of the base material to the affected layer.

Figure 13:
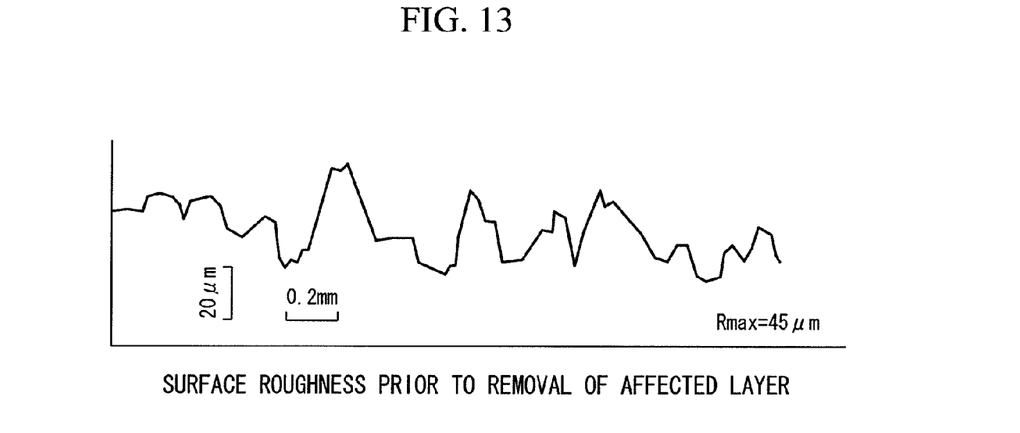
FIG. 13 is a graph that shows the surface roughness of the impeller prior to performing the acid cleaning treatment step.
Figure 14:
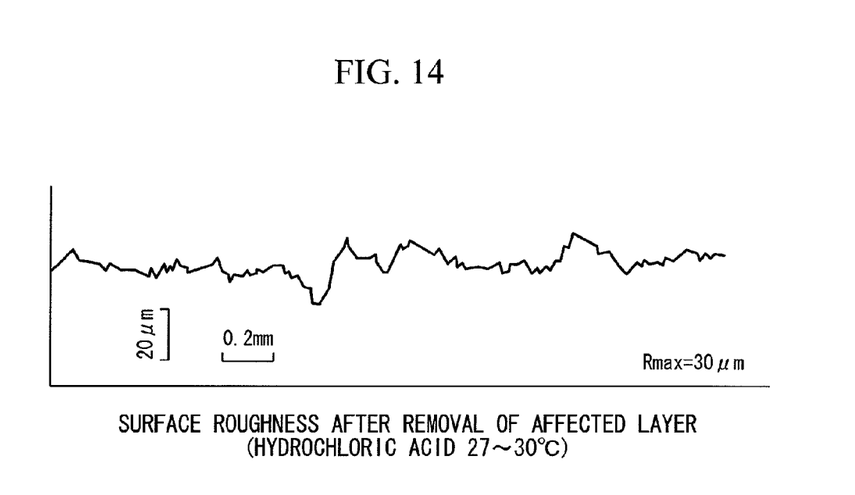
FIG. 14 is a graph that shows the surface roughness of the impeller after performing the acid cleaning treatment step with a hydrochloric acid temperature of 27 to 30° C.
Figure 15:
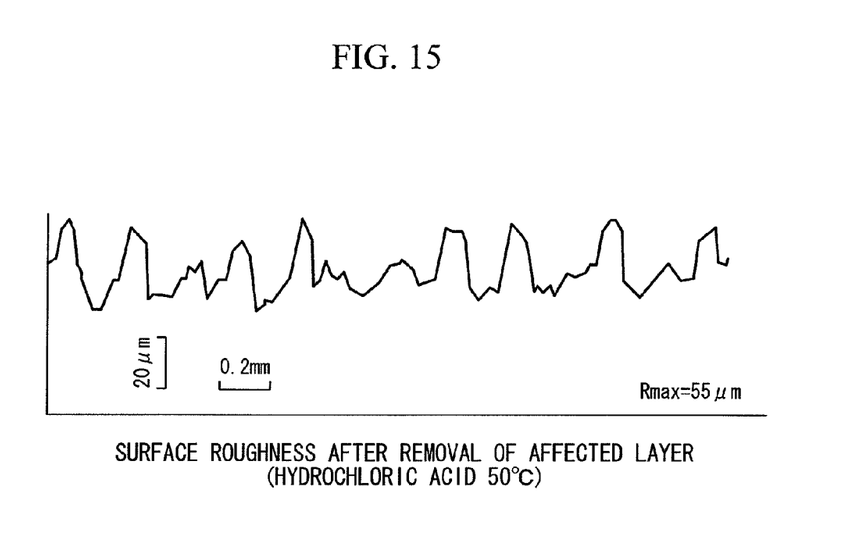
FIG. 15 is a graph that shows the surface roughness of the impeller after performing the acid cleaning treatment step with a hydrochloric acid temperature of 50° C.

Note that martensitic-stainless-steel SUS410 was used as the base material. Also, the affected layer H was formed by electric discharge machining on the base material when performing the experiment, but a graphite electrode was used in the electric discharge machining. As a result of measuring the thickness after forming the affected layer H, the thickness was 25 µm. As a result of measuring the surface roughness after forming the affected layer H, as shown in FIG. 13, the surface roughness was Ry=45 µm. As a result of performing the acid cleaning under these conditions, as shown in FIG. 12, it could be confirmed that when the temperature of the hydrochloric acid exceeds 30° C. with a hydrochloric acid concentration of 10 mass %, the base material/affected layer dissolution ratio increases, and the base material excessively dissolves. FIG. 14 shows the surface roughness after removing the affected layer in the case of the temperature of the hydrochloric acid being 27 to 30° C. FIG. 15 shows the surface roughness after removing the affected layer in the case of the temperature of the hydrochloric acid being 50° C. As is apparent by referring to these results, as shown in FIG. 14, the maximum surface roughness in the case of the temperature of the hydrochloric acid being 27 to 30° C. is 30 µm, while as shown in FIG. 15, in the case of the temperature of the hydrochloric acid being 50° C., the dissolution rate of the base material is too rapid, and the maximum surface roughness becomes 55 µm. From the above, in the case of using hydrochloric acid of 10 mass % as the acid cleaning solution, it is understood that 27 to 30° C. is suitable as the temperature of the acid cleaning treatment.

[Polishing Step]

The polishing step S5 shall be described. In this polishing step S5, polishing of the surface of the flow passage 5 is performed after the acid cleaning treatment step S4. Note that fluid polishing or electrolytic polishing is suitably selected as the method of polishing.

In fluid polishing, by running a media (which consists of an abrasive grain that is mixed in with a special putty-like material) at a high pressure onto a treatment region that is the flow passage 5 of the impeller 100, the surface of the flow passage is made smooth.

In electrolytic polishing, using a graphite electrode, metal on the passage surface is dissolved by passing electricity in an electrolytic solution, with the impeller side being the positive charge and the electrode side being the negative charge. Since the convex portions of the non-planarity that are formed on the flow passage surface on the impeller side are positioned closer to the graphite electrode than the concave portions, they are dissolved at a faster rate, and thereby the flow passage surface is made smooth.

By performing the aforementioned polishing, assuming the temperature of the acid cleaning solution is 27 to 30° C. in the acid cleaning treatment step S4, the surface roughness is around Ry=30 µm, but it is possible to finish it to a smoothness of Ry=2 to 5 µm.

[External Shape Finishing Step]

Next, the external shape finishing step S6 shall be described. This external shape finishing step S6 involves finishing the external shape by machining, and is a treatment that makes the overall dimensions become the predetermined values.

By performing the above-mentioned external shape formation step S1 to the external shape finishing step S6, the impeller 100 as shown FIG. 1 and FIG. 2 is manufactured.

According to the method for manufacturing the impeller 100 that is shown in the embodiment as described in detail above, by performing the first flow passage formation step S2 and the second flow passage formation step S3, it is possible to shorten the length to be machined by the electric discharge machining method. For this reason, by shortening the working electrode 20 that is used, and it is possible to prevent conventional deformation of the electrode. Also, in the first flow passage formation step S2, since it is not necessary to perform machining of a region on the inner circumferential side having a large curvature from the outer circumferential side of the disk-shaped body 10 in the axial direction, it is possible to perform the machining easily and accurately. Also, since it is necessary to just form a portion of the flow passage 5 in the above manner, it is possible to make the machining depth shallow. Thereby, the discharge of sludge that is generated along with the machining is simplified, and it is possible to suppress the generation of a secondary electric discharge by the sludge, and thus possible to improve the machining efficiency. Then, by forming the second region 31 of the remainder of the flow passage 5 in the second flow passage formation step S3, it is possible to readily, efficiently and accurately form the flow passage 5 as a whole.

In the aforementioned method for manufacturing the impeller 100, by performing the second flow passage formation step S3 by inserting the working electrode 30 that fits to the shape of the second region 31 from the inner circumferential side of the disk-shaped body 10 with an electric discharge machining method, it is possible to reliably form the second region 31 of the flow passage 5.

In the aforementioned method for manufacturing the impeller 100, since there is performed the acid cleaning treatment step S4 that performs acid cleaning treatment on at least the portion that becomes the surface of the flow passage 5 after the second flow passage formation step S3, it is possible to remove the affected layer H, and thereby it is possible to prevent a reduction in the metal fatigue property.

In the aforementioned method for manufacturing the impeller 100, since the polishing step S5 that performs polishing of the surface that has been subjected to the acid cleaning treatment step S4 is performed, it is possible to make the flow surface within the flow passage 5 in which the affected layer H has been removed smooth, and it is possible to reduce the resistance when a fluid flows through the flow passage 5. For this reason, in a centrifugal compressor in which is mounted a rotating body that is constituted by assembling the impeller 100 to a rotating shaft, it is possible to obtain a good compression efficiency.

Note that in the present embodiment, the acid cleaning treatment step S4 and the polishing step S5 were performed in the above manner, but it is not limited thereto, and the polishing step S5 may be carried out without performing the acid cleaning treatment step S4 when for example the effects of the affected layer H are minor.

Note that the aforementioned embodiment may be changed to the methods as shown in the below modifications.
(First Modification)

Figure 16:
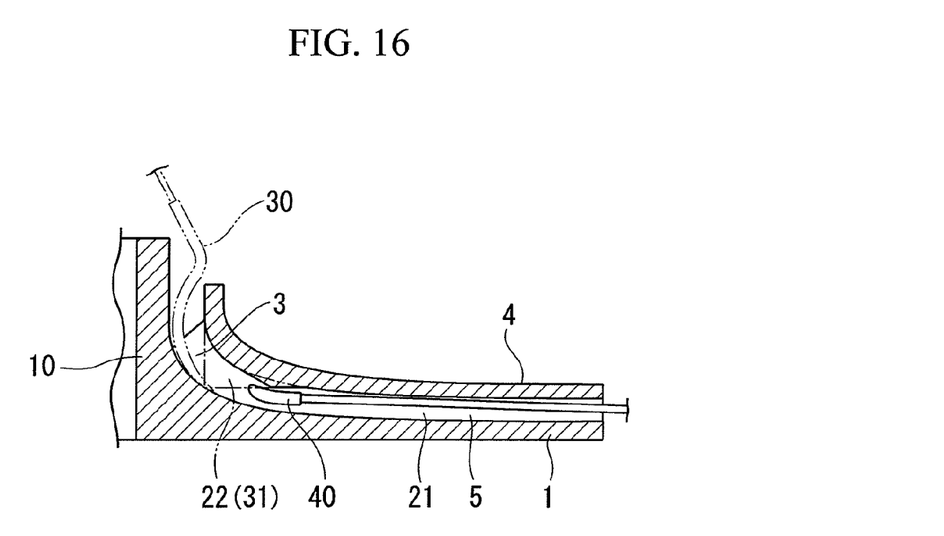
FIG. 16 is a sectional side view that describes a partial machining step in the manufacturing steps of the impeller of a first modification of the embodiment of the present invention.

The flow passage 5 was formed by electric discharge machining with the first flow passage formation step S2 and the second flow passage formation step S3, but after the first flow passage formation step S2, or after the second flow passage formation step S3, additionally a third passage formation step may be carried out. In this third passage formation step, as shown in FIG. 16, a partial working electrode 40 is used that is relatively shorter than the working electrodes 20 and 30. By using this kind of partial working electrode 40, even if the curvature diameter of the surface of the flow passage 5 is small, it is possible to smoothly form the surface of the passage 5 by suitably performing a machining at the region near the boundary between the first region 21 that is formed in the first flow passage formation step S2 and the second region 31 that is formed in the second flow passage formation step S3.
(Second Modification)

Figure 17:
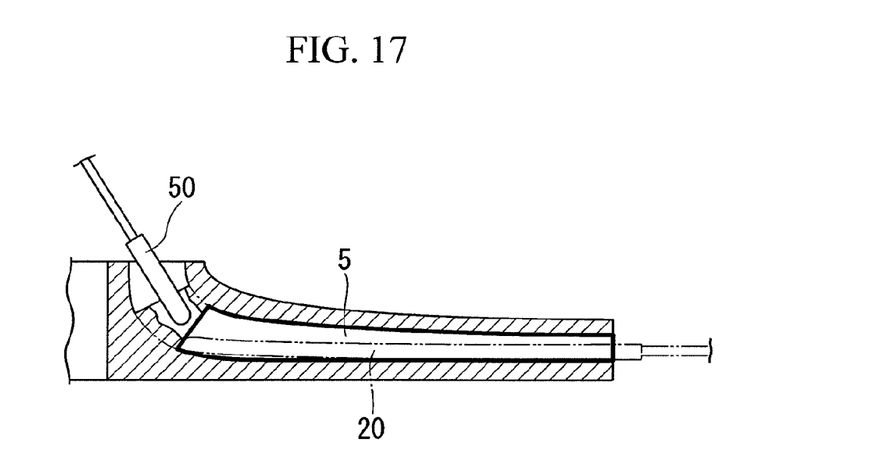
FIG. 17 is a sectional side view that describes a second flow passage formation step in the manufacturing steps of the impeller of a second modification of the embodiment of the present invention.

In the second flow passage formation step S3 described above, the second region 31 of the flow passage 5 was formed by electric discharge machining with the working electrode 30, by there are cases when it is possible to form the second region 31 by mechanical machining depending on the shape of the flow passage 5. In this case, as shown in FIG. 17, the mechanical machining of the portion of the second region 31 of the flow passage 5 may for example be performed with an end mill denoted by the reference numeral 50.
(Third Modification)

Figure 18:
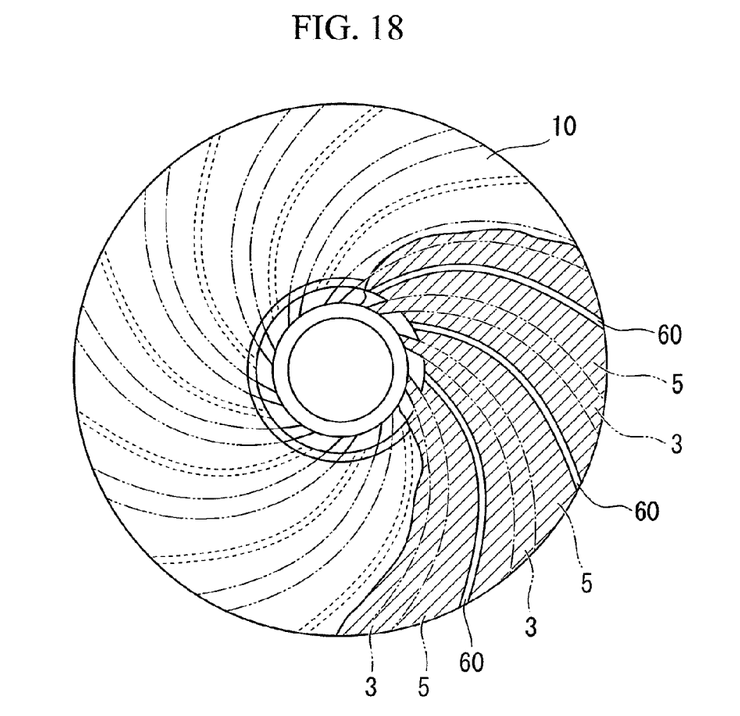
FIG. 18 is a partially broken-out front elevational view that describes the sludge discharge hole formation step in the manufacturing steps of the impeller of the embodiment of the present invention.
Figure 19:
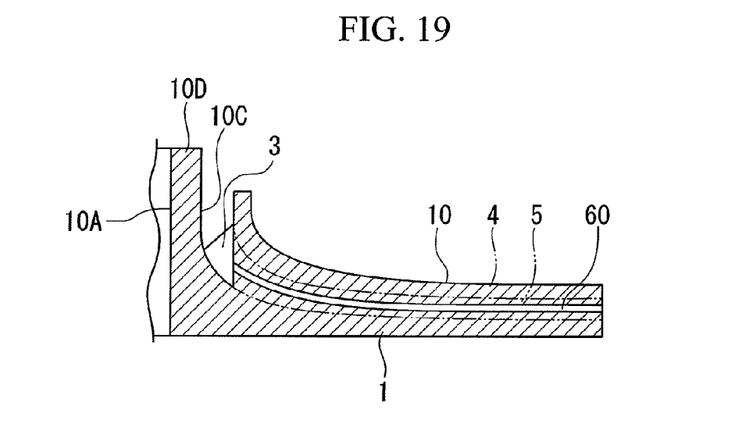
FIG. 19 is a sectional side view that describes the sludge discharge hole formation step in the manufacturing steps of the impeller of the embodiment of the present invention.

The first region 21 of the flow passage 5 was formed by the first flow passage formation step S2, and the second region 31 of the flow passage 5 was formed by the second flow passage formation step S3, but when carrying out these steps, as shown in FIG. 18 and FIG. 19, a discharge hole formation step that forms a sludge discharge hole 60 for removing the sludge from the electric discharge machining or mechanical machining may be carried out.

By providing this sludge discharge hole 60 in advance, it is possible to prevent the machining time from becoming longer due to the sludge when performing electric discharge machining in the first flow passage formation step S2 and the second flow passage formation step S3 that constitute machining of the present invention.

The embodiment of the present invention has been described in detail with reference to the drawings, but specific constitutions are not limited to this embodiment, and design modifications of a region that does not depart from the scope of the present invention are also included.

According to the method for manufacturing an impeller of a centrifugal rotating machine of the present invention, machining can be easily, efficiently, and accurately performed by performing a first flow passage formation step and a second flow passage formation step.

The invention claimed is:

1. A method of manufacturing an impeller for a centrifugal rotating machine that is approximately disk-shaped and has flow passages disposed between a plurality of blades, each of the plurality of blades being formed in a shape that curves to one side thereof in the circumferential direction along the radial direction with a first curved surface on a first side of the blade and a second curved surface on a second side of the blade, and being disposed in a radial manner from the inner circumferential side to the outer circumferential side, said method comprising:

forming a first flow passage that forms a first region on the outer circumferential side within the flow passage by inserting a first electrode of a shape fitting the flow passage with an electric discharge machining method from the outer circumferential side of the disk-shaped body having an outer shape of an impeller; and forming a second flow passage that forms a second region on the inner circumferential side within the flow passage from the inner circumferential side of the disk-shaped body, wherein in said forming the first flow passage, using the first electrode which has a first curved face with a curve that corresponds to the second curved surface of the blade and a second curved face with a curve that corresponds to the first curved surface of the blade, a curvature radius of the second curved surface of the blade is more than or equal to a curvature radius of the first curved face of the first electrode, a curvature radius of the second curved face of the first electrode is more than or equal to a curvature radius of the first curved surface of the blade, and the first electrode is capable of being inserted into the first flow passage so as to be spaced from the first flow passage in the circumferential direction, at the first region.

2. The method of manufacturing an impeller for a centrifugal rotating machine according to claim 1, further comprising polishing at least a surface of the first or second flow passage after formation of the first region and the second region.

3. The method of manufacturing an impeller for a centrifugal rotating machine according to claim 1, further comprising performing acid cleaning treatment on at least a portion that becomes a surface of the first or second flow passage after formation of the first region and the second region.

4. The method of manufacturing an impeller for a centrifugal rotating machine according to claim 3, further comprising polishing at least a surface of the first or second flow passage after formation of the first region and the second region.

5. The method of manufacturing an impeller for a centrifugal rotating machine according to claim 1, further comprising forming a third passage that additionally performs machining by electric discharge machining in the first region by inserting a third electrode for performing partial machining from the outer circumferential side of the disk-shaped body, after said forming the first flow passage or said forming the second flow passage.

6. The method of manufacturing an impeller for a centrifugal rotating machine according to claim 5, further comprising polishing at least a surface of the first or second flow passage after formation of the first region and the second region.

7. The method of manufacturing an impeller for a centrifugal rotating machine according to claim 5, further comprising performing acid cleaning treatment on at least a portion that becomes a surface of the first or second flow passage after formation of the first region and the second region.

8. The method of manufacturing an impeller for a centrifugal rotating machine according to claim 7, further comprising polishing at least a surface of the first or second flow passage after formation of the first region and the second region.

9. The method of manufacturing an impeller for a centrifugal rotating machine according to claim 1, wherein said forming the second flow passage includes inserting a second electrode fitting to a shape of the second region from the inner circumferential side of the disk-shaped body with the electric discharge machining method.

10. The method of manufacturing an impeller for a centrifugal rotating machine according to claim 9, further comprising polishing at least a surface of the first or second flow passage after formation of the first region and the second region.

11. The method of manufacturing an impeller for a centrifugal rotating machine according to claim 9, further comprising performing acid cleaning treatment on at least a portion that becomes a surface of the first or second flow passage after formation of the first region and the second region.

12. The method of manufacturing an impeller for a centrifugal rotating machine according to claim 11, further comprising polishing at least a surface of the first or second flow passage after formation of the first region and the second region.

13. The method of manufacturing an impeller for a centrifugal rotating machine according to claim 9, further comprising forming a third passage that additionally performs machining by electric discharge machining in the first region by inserting a third electrode for performing partial machining from the outer circumferential side of the disk-shaped body, after said forming the first flow passage or said forming the second flow passage.

14. The method of manufacturing an impeller for a centrifugal rotating machine according to claim 13, further comprising polishing at least a surface of the first or second flow passage after formation of the first region and the second region.

15. The method of manufacturing an impeller for a centrifugal rotating machine according to claim 13, further comprising performing acid cleaning treatment on at least a portion that becomes a surface of the first or second flow passage after formation of the first region and the second region.

16. The method of manufacturing an impeller for a centrifugal rotating machine according to claim 15, further comprising polishing at least a surface of the first or second flow passage after formation of the first region and the second region.

* * * * *